United States Patent
Wiget et al.

(10) Patent No.: US 7,702,808 B2
(45) Date of Patent: Apr. 20, 2010

(54) MULTI-CAST ENABLED ADDRESS RESOLUTION PROTOCOL (ME-ARP)

(75) Inventors: Marcel Wiget, Antibes (FR); Robert Pluim, Golfe Juan (FR); Simon David Bryden, La Roquette sur Siagne (FR); Geoffrey Mattson, Antibes (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 1891 days.

(21) Appl. No.: 10/444,397

(22) Filed: May 23, 2003

(65) Prior Publication Data

US 2004/0030804 A1 Feb. 12, 2004

Related U.S. Application Data

(63) Continuation of application No. 09/398,370, filed on Sep. 17, 1999, now Pat. No. 6,640,251.

(60) Provisional application No. 60/124,066, filed on Mar. 12, 1999.

(51) Int. Cl.
*G06F 15/173* (2006.01)

(52) U.S. Cl. .................. 709/238; 709/228; 709/242; 709/245

(58) Field of Classification Search ................ 709/245, 709/229, 228, 238
See application file for complete search history.

(56) References Cited

U.S. PATENT DOCUMENTS 6,101,543 A * 8/2000 Alden et al. ................ 709/229

* cited by examiner

*Primary Examiner*—Shawki S Ismail
(74) *Attorney, Agent, or Firm*—Mintz, Levin, Cohn, Ferris Glovsky & Popeo, P.C.

(57) ABSTRACT

A Multicast-Enabled Address Resolution Protocol (ME-ARP) is disclosed. This ME-ARP allows the building of independent IP based Virtual Private LAN segments (VPLS) over a multicast enabled IP backbone using stateless tunnels and optimal VPLS traffic forwarding. Each VPLS has an associated IP subnet which is completely independent from other VPLS or the underlying IP backbone itself. Each Customer Premises Equipment (CPE) device needs only to be configured with a VPLS identifier and its serving IP subnet per VPLS designated interface.

7 Claims, 4 Drawing Sheets

MULTI-CAST ENABLED ADDRESS RESOLUTION PROTOCOL (ME-ARP)

CROSS-REFERENCE TO COPENDING PATENT APPLICATIONS

This is a continuation of Ser. No. 09/398,370 now U.S. Pat. No. 6,640,251 filed Sep. 17, 1999, which claims priority from provisional patent application Ser. No. 60/124,066 filed Mar. 12, 1999.

FIELD OF THE INVENTION

This invention relates to a scalable and server-less solution to build Virtual Private LAN Segments (VPLS) based on a multicast enabled IP backbone and more particularly to a Multicast-Enabled Address Resolution Protocol (ME-ARP).

BACKGROUND OF THE INVENTION

The popularity of the Internet is driving requirements for secure and segregated IP interconnection of remote sites. One solution is to use the underlying network supporting virtual connections i.e. Frame Relay or ATM. These virtual connections can be separated by provisioning to form a Virtual Private Network which is Layer 3 protocol transparent. However if the underlying network is IP itself, as is the case with the Internet then IP tunnels can be used to interconnect two or more sites. Any other known layer 2 VPN (Virtual Private Network) solution used in the prior art requires a centralized server where all CPE (Customer Premises Equipment) and IP devices have to be statically or dynamically registered, like LANE (Local-Area-Network Emulation), NHRP (Next-Hop-Routing-Protocol) or Classical IP.

A need exists for building IP based virtual private LAN segments (sharing one IP subnet) with complete transparency regarding TCP/IP, site-independent CPE configuration and with dynamic stateless tunnels to optimally forward unicast traffic based on routing and policy per VPLS. VPLS with different Identifiers can use overlapping IP subnets. With the method of the present invention, a centralized server or a list of CPE devices configured for each VPN is not required.

SUMMARY OF THE INVENTION

One aspect of the present invention is to provide a scalable and server-less solution to build Virtual Private LAN Segments (VPLS).

Another aspect of the present invention is to provide a Multicast-Enabled Address Resolution Protocol (ME-ARP). This invention allows the building of independent IP based Virtual Private LAN segments (VPLS) over a multicast enabled IP backbone using stateless tunnels and optimal VPLS traffic forwarding. Each VPLS has an associated IP subnet which is independent from other VPLS or the underlying IP backbone itself. Each Customer Premises Equipment (CPE) device needs only to be configured with a VPLS identifier and its serving IP subnet per VPLS designated interface. In addition, each end station connected to a Physical LAN Segment (PLS) does not need to be modified in order to be a member of the VPLS. No other configuration parameters e.g. list of CPE devices, their logical or physical locations nor their IP addresses are required. The unique invention is ME-ARP (Multicast Enabled Address Resolution Protocol) including the creation of constructed lower layer address based on VPN (Virtual Private Network) Id and tunnel endpoint. Advantages provided by the method of the present invention include:

a) separation of customer IP address space from either the service provider or another customer determined by policy not to be in the same virtual private network (VPN);
b) capability for a remote site to belong to one or more VPN as long as the VPN policy allows. To provide support for IPv4 based applications at this point;
c) transparent or Routed VPN's (by use of external routers) can be constructed independently or combined with this architecture;
d) due to the use of an underlying IP multicast network to forward VPN broadcast traffic in this solution, there is no need to provide address or broadcast servers; and
e) VPN traffic forwarding is achieved via stateless and optionally secured tunnels which are optimally routed using the underlying IP network backbone routing architecture.

Figure 1A:
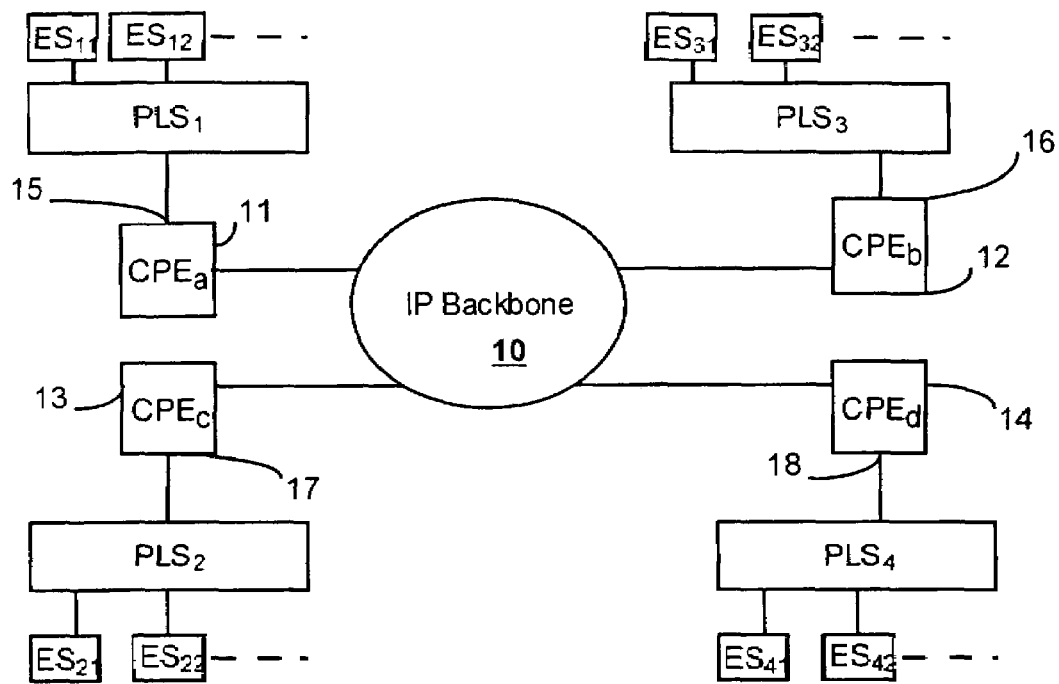
FIG. 1a is a block diagram illustrating a physical view of a Virtual Private LAN Segment (VPLS) network for use with the present invention.

Similar references are used in different figures to denote similar components.

In order to facilitate the description of the invention, the following abbreviations have been used. The terminology used in this document is based on the definitions proposed by the Internet Engineers Task Force (IETF).

| | |
|---|---|
| CBT | Core Based Tree Multicast Routing Protocol |
| CPE | Customer Premises Equipment |
| DVMRP | Distance Vector Multicasting Routing Protocol |
| GRE | Generic Routing Encapsulation |
| IGMP | Internet Group Management Protocol |
| LAN | Local Area Network |
| MOSPF | Multicast extensions for Open Shortest Path First |
| PA | Provider Address |
| PIM | Protocol Independent Multicast |
| PLS | Physical LAN Segment |
| VPN | Virtual Private Network |
| VPLS | Virtual Private LAN |
| UVIP | Unnumbered VPN Internet Protocol |

The term "Client Address" (CA) space or network ranges is used to describe the IP address space used by each VPN customer.

The term "Customer Premises Equipment" (CPE) defines an edge device (e.g., router, etc.), fully managed by the provider, connecting a customers PLS to its VPN.

The term "Provider Address" (PA) space or network ranges is used to describe the provider allocated IP addresses in his IP backbone. (e.g., Tunnel endpoints have an address assigned out of the PA range).

The term "Physical LAN Segment" (PLS) is used in this document to describe a broadcast domain, like a shared or switched ethernet segment, connecting hosts, servers and routers at each site. Without the use of a VPN technology, the scope of these PLS is limited per site.

A Virtual Private LAN Segment (VPLS) is the emulation of a LAN segment using Internet facilities. A VPLS can be used to provide what is sometimes known as a transparent LAN service, which can be used to interconnect multiple CPE nodes. It can be seen as a pure layer 2 bridged VPN solution.

The term virtual private networks (VPN) is widely used as a common description for any kind of network built over another network with limited scope.

The term "Unnumbered VPN IP" (UVIP) interface is used in VPLS to describe the tunnel endpoint connecting a PLS on a first site with all other PLS per VPN. In the scope of the customer's PLS, this interface doesn't need to have an IP address assigned to forward traffic (VPLS is a layer 2 VPN solution). The tunnel endpoint itself must have an IP address assigned, out of the providers address space.

DETAILED DESCRIPTION OF THE INVENTION

In order to take advantage of all the features of the present invention, it is assumed that the providers of IP backbone services are IP multicast capable. Similarly, it is assumed that CPE devices are able to join a multicast group using IGMP. It is not a requirement that all routers in the backbone have multicast capabilities. It is possible to interconnect the CPE devices via a partially meshed or "star-like" multicast backbone, built using a mix of multicast routing protocols and tunnels to interconnect multicast islands. IP multicast is used to forward broadcast and multicast traffic and for IP address resolution, but not for forwarding of unicast traffic.

Referring now to FIG. 1a, we have shown the physical view or service provider's view of a Virtual Private LAN Segment (VPLS). The IP backbone 10 and CPE devices 11, 12, 13 and 14 are managed and typically owned by the service provider. CPE devices 11-14 are typically comprised of routers, whereas each PLS is typically comprised of several IP capable devices such as end stations (ES1, ES2, etc.)

Figure 1B:
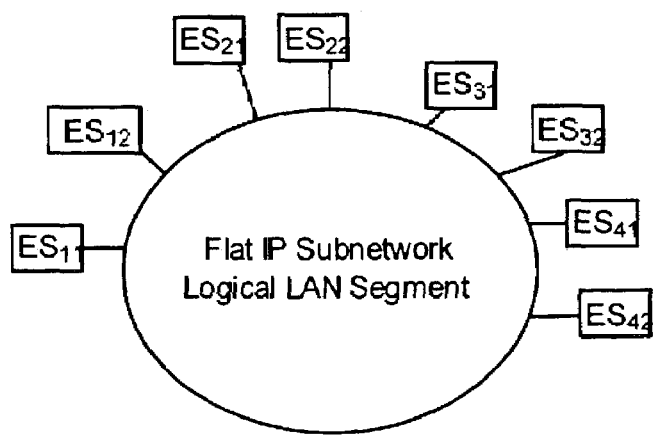
FIG. 1b is a diagram illustrating a logical view of the network of FIG. 1a or as would be seen from the customer's perspective.

FIG. 1b is a diagram illustrating a logical view of the network of FIG. 1a or as would be seen from the customer's perspective. Whereas in FIG. 1a the CPE devices are visible from the provider's perspective, LAN segments are transparent to the customers as illustrated in FIG. 1b. Similarly, CPE devices which are seen by the service provider are invisible to the customer.

Stateless tunnels or links are used in CPE (Customer Premises Equipment) between connected sites. The remote tunnel endpoint address information is directly mapped into the link layer address. ME-ARP is used for IP address resolution inside a VPLS. As a result, VPN connected IP devices will keep all relevant information about the destination tunnel endpoint and VPN membership in their own address resolution (ARP) table. Special unnumbered IP LAN interfaces will generate the link layer address based on a configured VPN identifier and dynamically learned tunnel endpoints (via ME-ARP).

Again, as illustrated in FIGS. 1a and 1b, a VPLS can span two or more sites, with all IP devices sharing the same IP subnet. The IP address and mask are chosen by the customer without any restrictions in relation to the provider or other customers. The CPE devices, managed by the provider, are transparent to the customer. This type of layer 2 VPN solution possesses the following benefits for the customer:

Transparency. No IP addresses must be given to the provider;

Flat IP subnet. The VPN can be seen as a VPLS, with transparent support for broadcast protocols like DHCP/BOOTP (Dynamic Host Configuration Protocol/BOOT-strap Protocol), Netbios/IP etc; and Broadcast and Multicast support. The customer can extend the VPN with their own routers and run any routing protocol over the VPN without any coordination with the provider.

Each VPLS has a provider wide unique IP multicast address assigned. A UVIP interface of a CPE device, shown at reference numerals 15, 16, 17 and 18, configured for a particular VPLS, will join the VPN's multicast group by using IGMP. All broadcast traffic is then encapsulated and forwarded to the VPN's IP multicast address. There is therefore no need for a central database to keep track of all UVIP interfaces joining a customer's VPN. This is handled by the IP multicast membership.

In order to forward IP unicast traffic, an enhanced version of proxy ARP is used. The differences from the standard proxy ARP are:

a) all ARP requests matching the customers IP subnet are encapsulated and forwarded to all VPN members by sending them to the VPN's IP multicast address. Note: The CPE device cannot determine, if an IP device is connected to the local physical segment or not.

b) a forwarded ARP request, after decapsulation, will replace the source hardware address (MAC, Media-Access-Control or physical Address) not with the routers own interface MAC address, but by a calculated address containing the tunnel source IP address, an interface unique VPN Id (e.g. VPN instance Id) and a CPE Id (to avoid loops in case of CPE redundancy).

The result of this "multicast enhanced ARP" (ME-ARP) process is that the customers IP devices will keep all relevant information about the destination tunnel endpoint and VPN membership in their ARP table. There is no overhead involved, if compared to a real physical IP subnet.

Unique VPN Identifier

Each VPN has a unique identifier assigned. For VPLS built of more than two physically separated sites this is a valid IP multicast address. As each VPN has a unique IP multicast Id assigned, IGMP and any multicast capable routing protocol (DVMRP (Distance Vector Multicast Routing Protocol), MOSPF (Multicast Open Shortest Path First), PIM (Protocol Independent Multicast), are used by a configured IP VPN interface connecting a Physical Segment to join the VPNs multicast group.

Individual CPE devices are configured as follows:

Based on the VPLS membership using IP multicast, there is no need for a central VPN membership database or protocol to distribute this information. It is enough to configure a new VPN member (physical segment) in the connecting CPE device. The following minimal information is configured per UVIP (Unnumbered VPN IP) interface:

a) VPN IP multicast Id;

b) IP Network/Mask. Assigned by the customer from the Client Address (CA) space. This information is used to determine the correct VPN, based on either source or destination IP address. This is important to support multi-netting on the same physical interface with many VPNs;

c) Tunnel IP address. This address from the Provider Address (PA) space is used to forward VPN traffic over the IP backbone to the correct tunnel end-point (bound to a VPN interface). The VPN identifier in each encapsulated packet can be used to identify the correct logical UVIP interface inside the CPE device;

d) MAC calculation algorithm. This optional, but recommended, configuration parameter allows the support of different MAC address calculation to prevent possible duplicates.

Figure 2A:
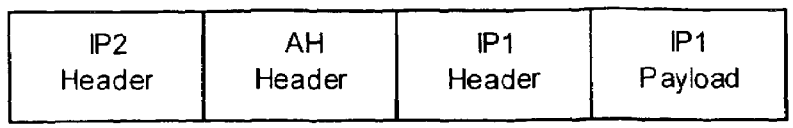
FIG. 2a illustrates a packet format corresponding to an IPsec Authentication Header (AH) encapsulation with authentication.
Figure 2B:
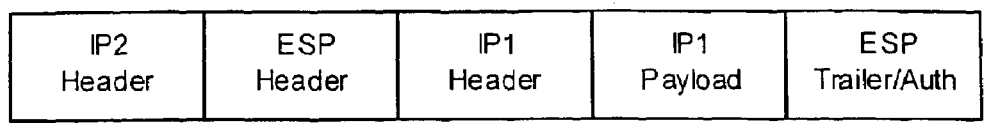
FIG. 2b illustrates a packet format corresponding to an IPsec Encapsulating Security Payload (ESP) with authentication privacy.

Referring now to FIGS. 2a and 2b, in the preferred embodiment of the invention, depending on the security requirements, three different encapsulation formats can be used: without security, with authentication only or with encryption. The encapsulated methods are based on IPsec tunnel mode [RFC2401 . . . RFC2406]. The IP2 header contains the IP source and destination address from the providers address space (tunnel endpoint IP addresses or address as destination address). The IP1 header is the original IP packet header.

In FIG. 2a, we have shown an IPsec AH encapsulation (with authentication). FIG. 2b shows an IPsec ESP encapsulation (with auth. privacy).

IP multicast and broadcast packets are encapsulated and tagged with the VPN multicast Id in the SPI field of the IPsec AH/ESP header and forwarded to the VPN IP multicast address (equal to VPN multicast Id). All active members of the VPNs multicast group receive the encapsulated packet and forward it to the appropriate VPN's UVIP interface.

Figure 3:
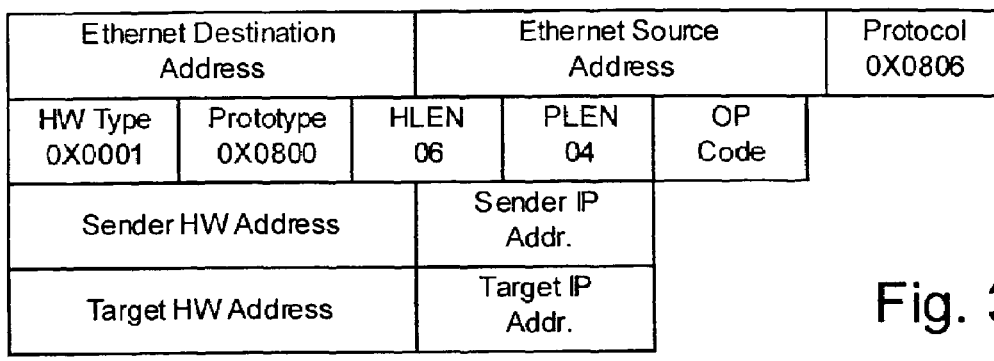
FIG. 3 illustrates a standard ARP packet format on Ethernet.
Figure 4:
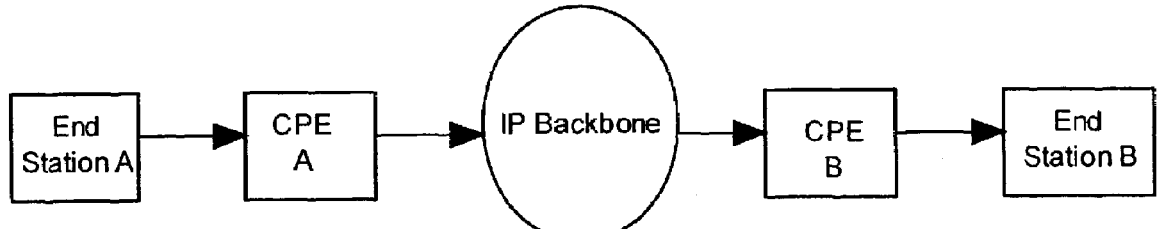
FIG. 4 is a block diagram of a IP Backbone network for illustrating the ME-ARP request/reply packet flow according to the present invention.
Figure 5:
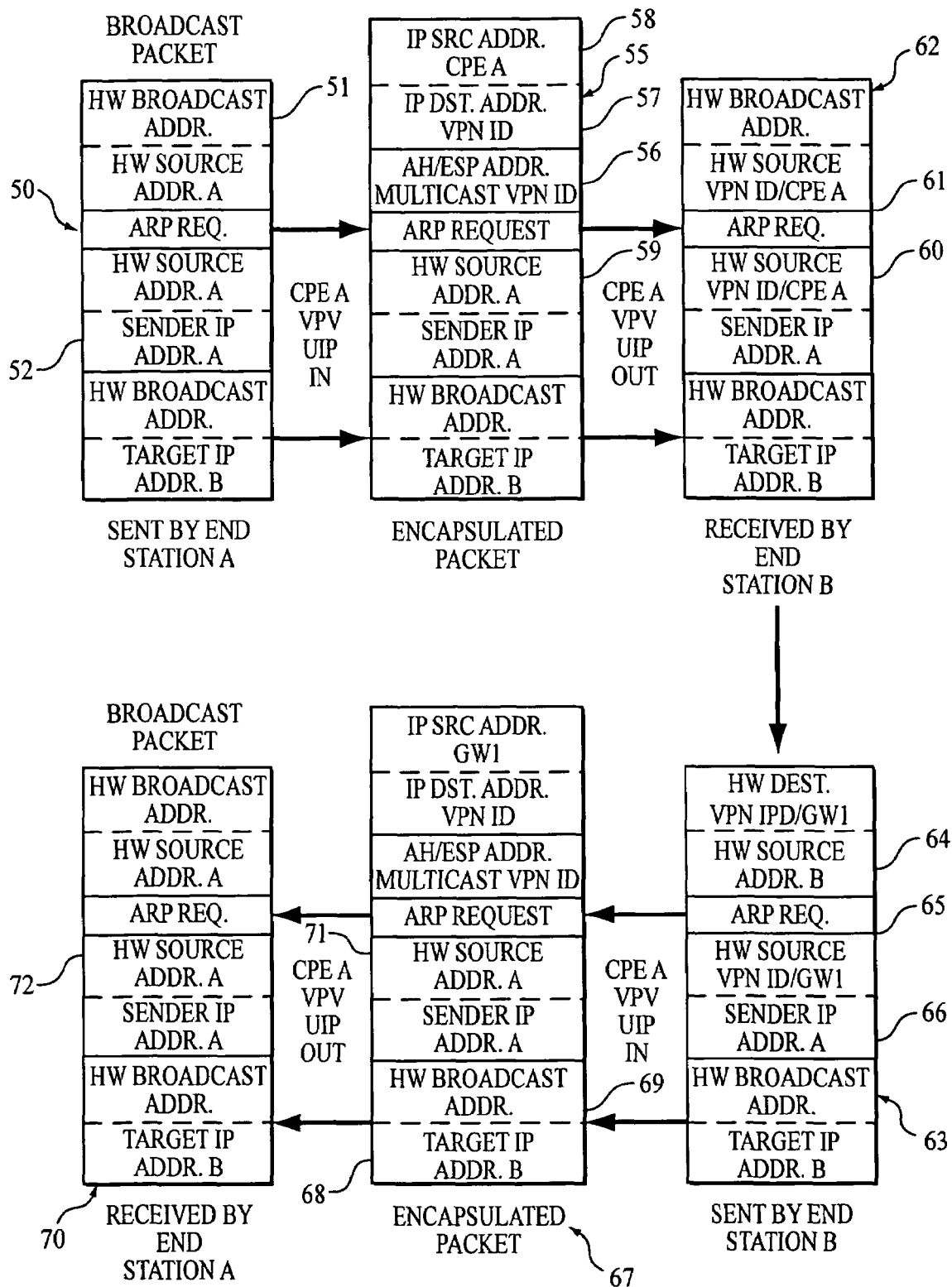
FIG. 5 is a block diagram illustrating the transfer of ME-ARP packet information between a first and second end station according to the method of the present invention.
Figure 6:
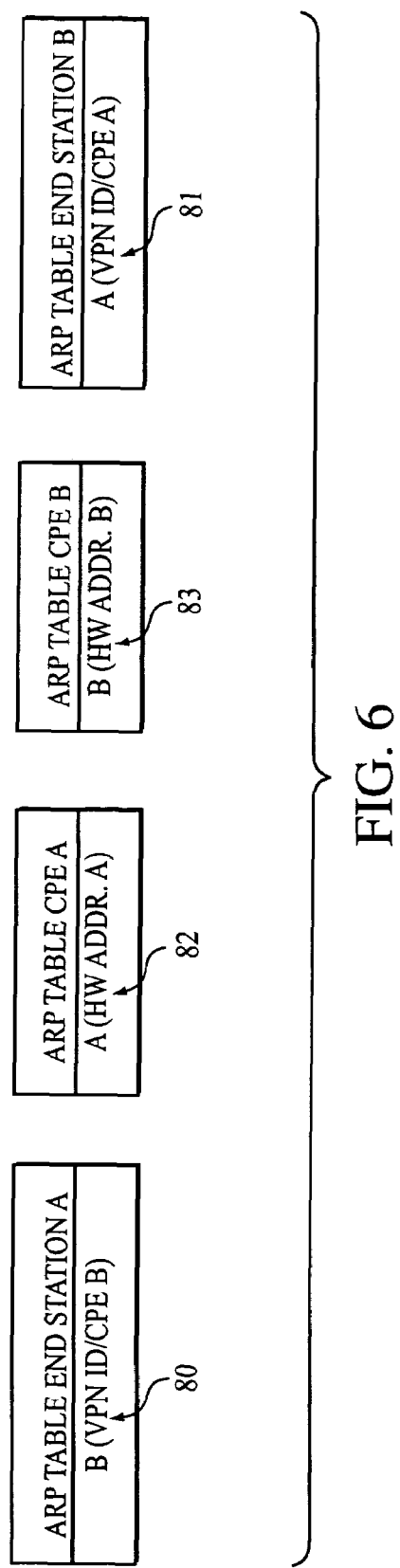
FIG. 6 is a table illustrating the content of the ARP tables at various point during the transfer of ME-ARP packet information.

Referring now to FIG. 3, we have shown an ARP Request/Reply packet including Ethernet transmission layer. In FIG. 4, we have shown a block diagram of an IP Backbone network and in FIG. 5, we have shown a block diagram illustrating the transfer of packet information between a first and second end station, respectively.

In operation, with reference to FIGS. 3, 4, 5 and 6, end station A wants to send an IP packet to end station B on the same logical subnet but connected to different gateways. It is assumed, that the ARP tables 80 and 81 from both end stations are empty. Therefore end station A sends an ARP request 50 to the ethernet broadcast address 51. CPE A, configured with the proper VPN information, checks the source IP address 52 of the ARP request packet 50 against its UVIP interfaces configured on the physical interface. In case of a match, it encapsulates the whole, unmodified, ARP request 50 into an IPsec packet 55 including the VPN identifier 56 (equals assigned IP multicast address) and forwards packet 55 to the VPN's multicast address 57 using the configured local IP tunnel-endpoint 58 as source address. CPE A also adds a local ARP entry for end station A in its ARP table 72 for that UVIP interface. (CPE A will forward the ARP request, even if end station B is connected to the same physical network).

All CPEs joining the VPN will receive this encapsulated ARP request, unpack it, and forward out the local UVIP interface with the following modification to the original ARP request 55:

replace the original HW source address 59 (MAC address from end station A) with a calculated MAC address containing the tunnel end-point IP address from CPE A(=source address from the received IPsec packet) and an optional interface unique VPN Id.

This new HW source address 60 is replaced in the ethernet header as well as in the ARP packet 61.

CPE B might add an entry to its ARP table 83 for caching. End station B receives the ARP request 62 and respond to it with a normal ARP reply containing its physical HW MAC address 64 as source in the ethernet header and in the ARP reply packet 65. An ARP entry for end station A with the source MAC address from the ARP request is added on end station B. The ARP table 81 of end station B now contains an entry for end station A with a constructed MAC address containing the tunnel-endpoint IP address and VPN Id. CPE B, configured to listen for constructed MAC addresses, identifies the ARP reply 63 from end station B by checking the source MAC address 64 as well as the source IP address 66 (part of VPN's IP network), encapsulate and forwards the ARP reply 67 directly to the addressed tunnel endpoint (extract tunnel endpoint IP address from destination MAC address).

CPE A decapsulates the ARP reply packet 67, checks the destination or target IP address 68 and replaces the destination or target MAC address 69 with the address found in its local ARP cache, and sends the constructed ARP reply 70 out to end station A on the local attached physical LAN segment. In addition, the source MAC address 71 (in the Ethernet header and ARP packet) is replaced with a constructed MAC address 72 containing an optional interface locally unique VPN Id and the IP address of CPE B (where the ARP reply came from).

If the ARP table 82 from CPE A does not contain an entry for end station A, then CPE A will have to send an ARP request out for end station A with end station B's IP address before forwarding the ARP reply packet out to end station A.

Finally, end station A receives the ARP reply packet 70 and builds an entry in its ARP table 80 with an entry for end station B and the MAC address containing the remote tunnel endpoint IP address and VPN Id.

The invention claimed is:

1. A method of enhancing address resolution protocol, comprising:

sending an internet protocol packet from one end station to a further end station, both the one end station and the further end station being on a same logical subnet but connecting to different gateways, the one end station sending an address resolution protocol request to an ethernet broadcast address, a customer premise equipment checking a source internet protocol address against unnumbered virtual private network internet protocol interfaces that are configured on a physical interface; and, in case of a match from the checking, encapsulating the address resolution protocol as a whole and unmodified into a packet that includes a virtual private network identifier and forwarding the packet to a multicast address of the virtual private network by using a configured local internet protocol tunnel endpoint as a source address.

2. A method as in claim 1, wherein the customer premise equipment adds a local address resolution protocol entry for the one end station in an address resolution protocol table of the customer premise equipment for the unnumbered virtual private network internet protocol interface.

3. A method as in claim 2, further comprising forwarding the address resolution protocol request by the customer premise equipment even if the further end station is connected to a same physical network.

4. A method as in claim 1, further comprising all customer premise equipment joining the virtual private network receiving the encapsulated address resolution protocol request and unpacking same and forwarding the same out a local unnumbered virtual private network internet protocol interface with a modification to the address resolution protocol that was original.

5. A method as in claim 4, wherein the modification includes replacing an original source address with a calculated address containing a tunnel endpoint internet protocol address from customer premise equipment.

6. A method as in claim 5, wherein the replacing is also with an interface unique virtual private network identification.

7. A method as in claim 1, wherein the further end station has an address resolution protocol table that contains an entry for the one end station with a constructed address containing a tunnel-endpoint internet protocol address and virtual private network identification.

* * * * *